Jan. 8, 1935.  B. DICK  1,987,100
COUPLING
Filed July 2, 1931
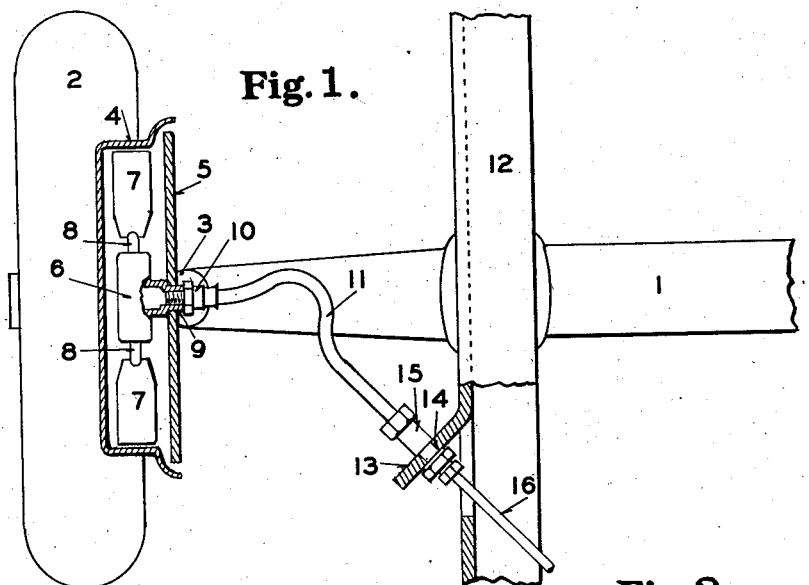
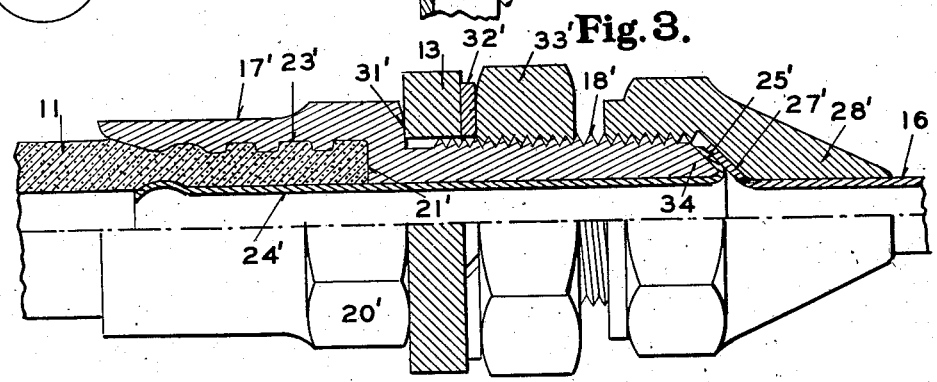
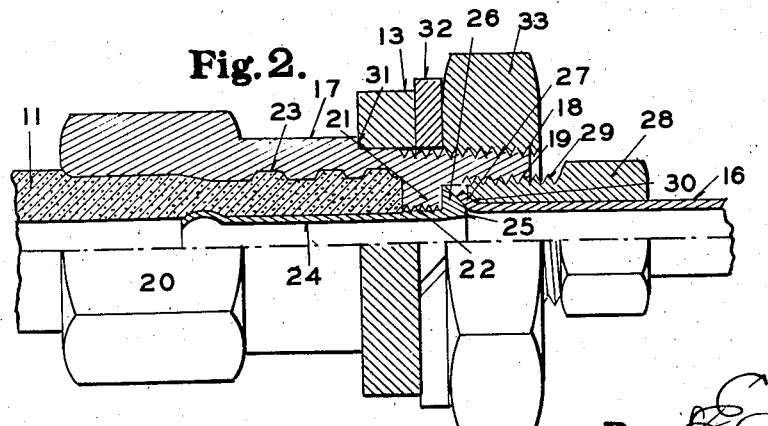
Inventor
BURNS DICK
By E. E. Huffman
Att'y.

Patented Jan. 8, 1935

1,987,100

UNITED STATES PATENT OFFICE 1,987,100

COUPLING

Burns Dick, Ferguson, Mo., assignor to Wagner Electric Corporation, St. Louis, Mo., a corporation of Delaware Application July 2, 1931, Serial No. 548,285

9 Claims. (Cl. 285—86)

My invention relates to a hose connector and associated parts, particularly suitable for providing a fluid-tight joint between the flexible hose leading to the wheel cylinders of a hydraulic brake mechanism and the rigid tube from the source of pressure.

In prior connections of this type a large number of parts have been used which resulted in a joint of relatively large over-all dimensions and a high cost of manufacture. It is, therefore, the principal object of my invention to construct a hose connector of the type referred to that contains a minimum number of parts, is very compact and simple in construction, is capable of withstanding high pressures without leakage, and that can be manufactured at a distinct saving in cost.

Other and further objects of my invention will become apparent from the following description taken in connection with the accompanying drawing which illustrates a preferred embodiment, and a modification thereof.

In the drawing Figure 1 is a diagrammatic view of a front wheel and a portion of the frame of a motor vehicle showing my novel hose connector and its relation to the surrounding parts; Figure 2 is a view, partly in elevation and partly in cross-section, of the preferred embodiment of my invention; and Figure 3 is a view, partly in elevation and partly in cross-section, of a modification.

Referring to the drawing, and especially to Figure 1, the numeral 1 indicates the front axle of a motor vehicle, at the outer end of which is mounted the usual wheel construction 2 by means of the steering knuckle 3. The wheel carries fixed thereto the brake drum 4 which is closed at its open side by means of a backing plate 5 attached to the steering knuckle. The wheel cylinder 6 of the hydraulic brake applying system is carried by the backing plate and lies between the ends of the pivoted brake shoes 7, which shoes are operated by oppositely moving pistons and piston rods 8 in a well known manner. The wheel cylinder 6 has an internally threaded opening in a portion 9 extending through the backing plate 5 adapted to receive the externally threaded fitting 10 attached to one end of a flexible conduit or hose 11 for conducting fluid under pressure to the cylinder to actuate the brakes. The channeled frame member 12 of the chassis of the motor vehicle which is suitably mounted on the axle 1, is provided with a struck-out portion 13 approximately opposite the wheel. This struck-out portion is provided with an opening 14 to receive my novel hose connector 15 by means of which a fluid-tight joint is formed between the flexible conduit or hose 11 and the copper tube 16 leading from the source of fluid pressure (master cylinder).

Referring to Figure 2, my novel connector 15 will now be described in detail. The hollow body member 17 is provided at one end with external threads 18 and internal threads 19, and at the other end with a wrench-receiving portion 20. Adjacent the inner end of the internal threads 19 is formed an inwardly extending ring 21 integral with the body member, thereby providing a pair of abutment shoulders. The inner surface of the ring is serrated, as shown at 22. The inner periphery of the body member on the end opposite the end having the threaded portion, is provided with grooves 23. The hose 11 extends into the grooved end of the body member and abuts the side of the ring 21. A nipple 24, provided with a flanged end 25 abutting the ring 21, extends through the serrated opening of the ring 21 into the bore of the hose and is expanded, causing the hose material to be forced into the grooves 23. Also, during the process of expanding, the material of the nipple is forced into the serrations 22 and thus securely held against longitudinal displacement. The flange 25 is formed with a beveled periphery 26 on the side adjacent the internal threads 19 of the fitting.

The copper tube 16, leading from the source of pressure, is flared outwardly at its end, as shown at 27, in such a manner as to cooperate with the beveled periphery of the flange 25. A nut 28 having external threads 29 is adapted to cooperate with the internal threads 19 and surrounds the tube 16. The end of the nut 28 is reamed out to provide a cone-shaped opening 30 to cooperate with the flared end of the tube. By placing the flared end of the tube against the beveled flange of the nipple and forcing the end of the nut against the flared end, a fluid-tight joint is secured.

The body member 17 of the connector is also provided with an external peripheral shoulder 31 adjacent the inner end of the threads 18 to form an abutment for the struck-out portion 13 of the frame surrounding the opening 14. A lock washer 32 and nut 33, cooperating with the external threads 18, are provided to tightly clamp the fitting member to the portion 13 and thereby form a rigid support for the entire assembly.

In the modification disclosed in Figure 3, the hollow body member 17' is provided with external threads 18' at one end and a wrench-receiving portion 20' in a manner similar to the preferred embodiment. The threaded end, however, is longer, and the portion 20' also serves as the abutting shoulder 31' for the struck-out support 13 of the vehicle frame. The body member is provided with an internal shoulder 21' for abutting the end of the hose or conduit. The nipple 24' extends completely through the fitting and is expanded in the same manner as the nipple 24 to hold the end of the hose in the fitting by means of the grooves 23'.

The end of the body member 17' is beveled, as shown at 34, and has, adjacent thereto, the turned-back flanged end 25' of the nipple. The flared end 27' of the tube 16 is adapted to lie adjacent the flange 25' of the nipple and to be tightly pressed thereagainst to form a fluid-tight joint by means of the cone-shaped nut 28' cooperating with the threads 18' of the body member. The nut 33' also cooperates with the threads 18' to tightly clamp the body member against the supporting portion 13 through the washer 32'.

Having fully described my invention, what I claim as new and desire to secure by Letters Patent of the United States is:

1. In hydraulic braking apparatus for vehicles embodying a flexible hose and metallic tubing for transmitting fluid pressure, means for connecting the hose and tubing which comprises a tube coupling member and a hose connector provided with a threaded portion for engagement with said tube coupling member, said hose connector having one end permanently secured to the hose and being provided with an integral externally threaded extension and with an integral external shoulder of larger diameter than said threaded extension, and a clamping nut on said threaded portion and adapted to cooperate with the shoulder to clamp the connector to a part of the vehicle.

2. In hydraulic braking apparatus for vehicles embodying a flexible hose and metallic tubing for transmitting fluid pressure, means for connecting the hose and tubing which comprises a tube coupling member and a hose connector provided with a threaded portion for engagement with said tube coupling member, said hose connector having one end permanently secured to the hose and being provided with an externally threaded extension and with an external shoulder of larger diameter than said threaded extension, and a clamping nut on said threaded portion and adapted to cooperate with the shoulder to clamp the connector to a part of the vehicle, said connector also comprising a nipple extending into the bore of the hose and having an extension engaged by the tubing, said engaging surfaces being held in liquid-tight relation by the tube coupling.

3. The combination with a support, of a coupling comprising a hollow body member having an integral internal ring spaced from the ends thereof, a flexible conduit element permanently secured to one end of said body member, means carried by the internal ring of the body member provided with a conical surface lying within the body member, a tube having a flared end extending into the end of the body member which is opposite the end connected to the conduit, means surrounding the tube and engaging the body member for forcing the flared end of the tube against the conical surface, and means for securing the body member to the support.

4. In apparatus of the class described, the combination with a support, of a conduit, a body member provided with an internal shoulder and permanently connected at one of its ends with the conduit, a nipple extending into said conduit and provided with a beveled flange lying within the body member adjacent the internal shoulder of said body member, a tube extending into said body member and provided with a flared end adapted to engage the beveled flange of the nipple, means for holding the flared end of the tube in fluid-tight engagement with the beveled flange of the nipple, and means for securing the body member to the support.

5. In apparatus of the class described, the combination with a support, of a conduit, a body member connected at one of its ends with the conduit and provided with an internal ring lying within the body member and abutting the end of the conduit, a nipple extending into the conduit and provided with a flange lying within the body member and abutting the internal ring of the body member on the side opposite the conduit, a tube having a flanged end adapted to engage the flange of the nipple, means for holding the flanges in fluid-tight engagement, and means for clamping the body member to the support.

6. In hydraulic braking apparatus for vehicles, the combination of a support carried by the vehicle and provided with an opening, a flexible hose, a terminal member surrounding the end of said hose and permanently connected thereto, the end of said terminal member being externally threaded and extending through said opening in the support and said terminal member having an integral shoulder for engaging the support, a clamping nut cooperating with said external threads for securing the terminal member to the support, a tube, and means for connecting said tube to the end of the terminal member which extends through the opening in the support.

7. In apparatus of the class described, the combination with a support having an opening therethrough, of a flexible hose, a body member provided with an internal shoulder and permanently connected at one of its ends with the hose, said body member also being provided with an externally threaded portion extending through the opening in the support and an external shoulder for engaging the support, a nut cooperating with the external threads for clamping the body member to the support, a nipple extending into said hose and provided with a flanged end lying within the body member and abutting the internal shoulder, a tube extending into the body member and having a flanged end engaging the flanged end of the nipple, and means for maintaining the flanges in fluid-tight engagement.

8. In apparatus of the class described, the combination with a support having an opening therethrough, of a conduit, a body member permanently connected at one of its ends with the conduit, a nipple carried by said body member and extending into said conduit, said body member being provided with an annular extension projecting beyond the end of the nipple and extending through the opening in the support, said body member also being provided with an external shoulder for engaging the support, means carried by said extension and forming an annular surface, a tube provided with a flanged end, means surrounding the tube and engaging the body member for forcing the flanged end of the tube in fluid-tight engagement with said annular surface, and means cooperating with the extension for clamping the shoulder of the body member against the support.

9. In apparatus of the class described, the combination of a support having an opening therethrough, of a flexible hose, a fitting permanently secured to the hose and having an integral extension projecting through said opening in the support, means for securing the extension to the support, a fluid transmitting tube, and coupling means for securing the tube in fluid-tight relation with the extension of the hose fitting.

BURNS DICK.